(12) United States Patent
Vasireddy et al.

(10) Patent No.: US 11,470,068 B2
(45) Date of Patent: Oct. 11, 2022

(54) SYSTEM AND METHODS FOR SECURELY STORING DATA FOR EFFICIENT ACCESS BY CLOUD-BASED COMPUTING INSTANCES

(71) Applicant: PricewaterhouseCoopers LLP, New York, NY (US)

(72) Inventors: Praveen Vasireddy, Tampa, FL (US); Sriraj Kadimisetty, Tampa, FL (US); Michael Flynn, Tampa, FL (US); Michael Baccala, Tampa, FL (US); Vinod K. Kandepi, Tampa, FL (US); Shiva Sadula, Tampa, FL (US)

(73) Assignee: PricewaterhouseCoopers LLP, New York, NY (US)

( * ) Notice: Subject to any disclaimer, the term of this patent is extended or adjusted under 35 U.S.C. 154(b) by 0 days.

(21) Appl. No.: 15/931,417

(22) Filed: May 13, 2020

(65) Prior Publication Data

US 2020/0366660 A1 Nov. 19, 2020

Related U.S. Application Data

(60) Provisional application No. 62/847,850, filed on May 14, 2019.

(51) Int. Cl.
*H04L 29/06* (2006.01)
*H04L 9/40* (2022.01)
*G06F 21/62* (2013.01)

(52) U.S. Cl.
CPC .......... *H04L 63/08* (2013.01); *G06F 21/6218* (2013.01); *H04L 63/10* (2013.01)

(58) Field of Classification Search
None
See application file for complete search history.

(56) References Cited

U.S. PATENT DOCUMENTS

2013/0061337 A1* 3/2013 Zimberoff .............. G06Q 50/28
726/30
2013/0212704 A1* 8/2013 Shablygin ........... G06F 21/6272
726/28

(Continued)

FOREIGN PATENT DOCUMENTS

WO 2015/197564 A1 12/2015

OTHER PUBLICATIONS

International Search Report and Written Opinion dated Aug. 18, 2020, directed to International Application No. PCT/US2020/032727; 13 pages.

*Primary Examiner* — Benjamin E Lanier
(74) *Attorney, Agent, or Firm* — Morrison & Foerster LLP

(57) ABSTRACT

Systems and methods for securely storing data for efficient access by cloud-based computing instances is provided. In one or more examples, a computing hub can receive one or more access requests to data stored within a persistent data storage computing resources that in connected to the computing hub. The computing hub can be configured to determine if the access request is from an authorized computing resource, and can then generate one or more tokens that provide access to the computing resource. The one or more tokens can include information regarding the IP address of the requesting cloud-based computing resource, and each time that the cloud-based computing resource uses the token to request access to the stored data, the computing hub can check the IP address of the computing resource against the IP address indicated on the token to decide whether or not to grant access to the data.

14 Claims, 11 Drawing Sheets

(56) References Cited

U.S. PATENT DOCUMENTS

| | | | |
|---|---|---|---|
| 2014/0189888 A1* | 7/2014 | Madhok | H04L 63/08 |
| | | | 726/29 |
| 2016/0050272 A1 | 2/2016 | Raduchel | |
| 2017/0126502 A1* | 5/2017 | Horstmann | H04L 67/1021 |
| 2017/0169249 A1 | 6/2017 | De Oliveira et al. | |
| 2018/0367528 A1 | 12/2018 | Schwarz et al. | |
| 2019/0213104 A1* | 7/2019 | Qadri | G06F 21/12 |
| 2020/0314167 A1* | 10/2020 | Achyuth | G06F 21/6209 |

* cited by examiner

SYSTEM AND METHODS FOR SECURELY STORING DATA FOR EFFICIENT ACCESS BY CLOUD-BASED COMPUTING INSTANCES

REFERENCE TO RELATED APPLICATIONS

This application claims the benefit of U.S. Provisional Patent Application No. 62/847,850, filed May 14, 2019, the entire contents of which are incorporated herein by reference.

FIELD OF THE DISCLOSURE

This disclosure relates to receiving and storing data sets from a plurality of users in a persistent data store and making that data available for access by cloud-based computing instances in an efficient and secure manner.

BACKGROUND OF THE DISCLOSURE

The era of "big data", in which commercial and governmental enterprises seek to store and analyze large data sets, have presented many challenges in terms of processing and managing such large data sets in a cost-effective and secure manner. "Persistent systems" in which physical and static hardware are built and maintained to handle the storage and analysis of large data sets can often be inefficient from a computing resource and cost perspective. For instance, the computing requirements to analyze large data sets can fluctuate depending on the needs of a particular enterprise. Thus, a persistent system has to be built keeping in mind the worst-case scenario (i.e., the maximum amount of computing resources that could possibly being needed to analyze data.) From a cost-perspective, maintaining a persistent system can be inefficient, because the cost required to build and maintain a persistent system that can deal with a worst-case scenario often requires enterprises to spend more on computing resources than is really required.

There can be additional challenges to managing big data system, in business environments in which multiple enterprises turn to a third-party to help manage and implement the analysis of large data sets. For instance, the cost of provisioning and maintaining big data systems by a third-party can be paramount. A client may be sensitive to costs and thus would require that a third party vendor offer them the most efficient and cost-effective solution. Additionally, since a third-party could potentially handle data from multiple private or governmental enterprises, it is important for a third-party vendor to store and operate on the data sets in a secure manner, ensuring not only that malicious external users do not have access to the data, but also ensuring that one client does not gain access to another client's data accidently or inadvertently by virtue of their access to their own data set stored by the third party vendor.

In light of the challenges described above, there can be a need for a system and method of building and maintaining computing resources to handle large data sets in a cost-effective and resource efficient manner. Such systems and methods may also be required to have additional security measures in place so as to secure the data, especially in instances where third-parties are asked to build and maintain such systems for multiple clients as described above.

SUMMARY OF THE DISCLOSURE

Accordingly, systems and method for arbitrating access to data stored on a persistent storage resource by one or more computing nodes is provided. In one or more examples, a data set can be initially received and stored in a first zone of a persistent data storage resource. In one or more examples, the data stored in the first zone of a persistent data storage resource can be inspected by anti-virus software and encrypted so as to prepare it to be accessible for access by one or more computing resources. Once the data has been encrypted and scanned, the data can be transmitted to a second zone of the persistent data storage resource and placed into a secure container within the second zone of the persistent data storage resource.

In one or more examples, the data can be stored within a container within the second zone of the persistent data storage resource. The second zone of the persistent data storage resource can include a plurality of containers with each container containing the data of a specific client and/or engagement. The second zone of the persistent data storage resource can be configured so that access to the data is only granted on a per container basis. In other words, a computing resource seeking access to a particular data set, can only be granted access to the particular container in which the data needed by the computing resource is stored.

In one or more examples, the vault can keep track of expiring tokens and can automatically renew those tokens, thereby granting a computing resource uninterrupted access to the data for the duration of an engagement.

DETAILED DESCRIPTION OF THE DISCLOSURE

Figure 1:
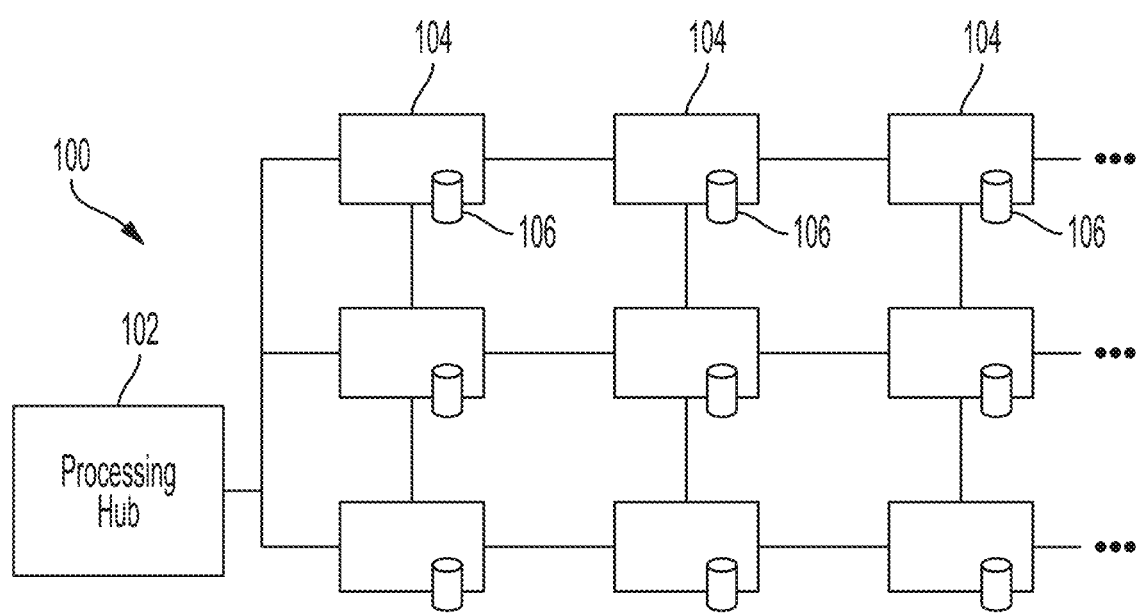
FIG. 1 illustrates an exemplary persistent computing system according to examples of the disclosure.

The following description sets forth exemplary methods, parameters, and the like. It should be recognized, however, that such description is not intended as a limitation on the scope of the present disclosure but is instead provided as a description of exemplary embodiments.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present invention include process steps and instructions described herein in the form of an algorithm. It should be noted that the process steps and instructions of the present invention could be embodied in software, firmware, or hardware, and, when embodied in software, they could be downloaded to reside on, and be operated from, different platforms used by a variety of operating systems.

As computing technology evolves, current physical hardware computing systems are able to store more data and are able to perform analysis on the data in a quick and efficient manner. With the ability to store larger and large data sets, the age of "big data" has arrived. "Big data" can refer to systems and methods for analyzing and extracting information from data sets that are too large or complex to be deal with by traditional data-processing applications. Computing systems that are often employed to handle large and complex data sets, often require dedicated computing resources to handle individual tasks that use the data sets to extract valuable information for enterprises seeking to make use of large data sets that have been collected.

Given the size and complexity of today's data sets, the computing resources that can be provisioned and maintained to handle the analysis of large and complex data sets can often be expensive and inefficient at meeting the fluctuating needs of big data analysis. Furthermore, in situations in which third parties are engaged to create multiple computing systems for a plurality of clients, the building and provisioning of dedicated and secure computing environments for each client while maintaining cost-effectiveness can be challenging.

Current methods of ingesting data and building computing resources to analyze and operate on the ingested data involve the creation and use of persistent computing resources. Often times, storage and computing resources are coupled together in such systems. Persistent computing systems can refer to the provisioning of physical computing hardware that can be built to handle the storage of data as well as the computing hardware that will be used to perform operations on the data. Such physical hardware can lack the flexibility needed to manage varying and fluctuating computing needs, since the only way to scale the system for demand can be to build and add additional physical hardware to handle increased loads.

Thus, when building persistent computing systems, often times a designer must build the system according to the maximum possible need of the system, even if such a scenario may only be realized for short instances of time. Thus, using persistent systems to create the computing resources often required to analyze large data sets can be inefficient insofar as the amount of computing resources utilized is far greater than the average need of the system.

FIG. 1 illustrates an exemplary persistent computing system according to examples of the disclosure. The system 100 of FIG. 1 can represent some of the computing resources required to store large data sets, provide access to those data stored data sets, perform processing operations on the data sets, and storing the results of that processing for later use.

The system 100 in FIG. 1 can include a main computing hub 102 that includes one or more software-based applications that can serve as a hub for coordinating the computing resources required to store and process the large data sets. In one or more examples, the computing hub 102 can be connected via a computing network to one or more external entities. In one or more examples, the computing hub can be configured to receive data from the one or more external entities. As discussed above, the received data can be voluminous and complex, and the computing system 100 can be configured to store the large amount of data and perform analyses on the data using the computing resources of the system 100 as discussed below.

As described above, the computing hub 102 can serve as an interface between external entities that have data sets that they want to be processed, and the actual computing resources that can be used to process that data. As an example, the system 100 can include one or more computing nodes 104. In the example of FIG. 1, the system is depicted as having multiple computing nodes, but other exemplary systems can include one such node or thousands, or hundreds of thousands of computing nodes The number of computing nodes 104, as discussed in detail below, can be a function of the processing requirements of the system 100.

In one or more examples of the disclosure, each computing node 104 can also include a data storage resource 106 that is configured to store data that is to be analyzed and or processed. Additionally the data storage resource 106 can also be configured to store the results of the analysis/processing (i.e., the output) in addition to also storing the data to be analyzed/processed (i.e., the input). In the example of FIG. 1, the computing nodes and data storage are implemented together, meaning that each node can store its own data.

In one or more examples, the data storage resources 106 can also be configured to provide efficient access to the stored data, for instance by running database software that can index the data stored in it, thereby giving easy access to the computing hub or another computing resource to retrieve the specific data they are looking to access.

The computing nodes 104 can be configured to perform the processing and analysis on the data stored at data storage resource 106, as desired by the external entities that provide the data to be analyzed. Thus in one or more examples, the specific hardware used to implement the computing nodes and the number of such nodes can be dependent on the computing desires of the entity furnishing the data.

The computing nodes 104 can be configured to perform the processing and analysis on the data stored at data storage resources 106 of each node 104, as desired by the external entities that provide the data to be analyzed. Thus in one or more examples, the specific hardware used to implement the computing nodes and the number of such nodes can be dependent on the computing desires of the entity furnishing the data.

To illustrate the concepts above, an example application that could use a computing system 100 illustrated in FIG. 1 is provided. If an entity wished to implement a facial recognition system so that its employees could have access to various areas within the company, they could implement a system such as that depicted in FIG. 1. Each user of the facial recognition program, can have data associated with their user profile, the data can represent the unique markers of a face in binary form that can be used to determine if a particular face being analyzed matches a given profile.

The facial data can be ingested by the computing hub 102 and stored in the data storage resource 106 corresponding to the computing node or nodes that have been dedicated for the facial recognition processing. When processing data (i.e., performing facial recognition), the system 100 can access the facial profiles stored at each data storage resource 106 associated with a facial recognition computing node 104, and can use compute nodes 104 to perform the actual comparison between data captured by a camera and the user profiles stored by the computing system 100.

As the system 100 of FIG. 1 can be a "persistent" system, this can mean that each and every component within the system 100 can be implemented using physical hardware. An approach to building a computing system using physical hardware, can prove to be an inflexible approach. For instance, taking the facial recognition example provided above, when the system is initially provisioned, the resources can be provisioned based on the computing needs at the time of the system's inception. For instance, if a company has 5000 employees, the data storage resources 106 may be selected so that it has enough capacity to not only store the 5000 facial profiles, but to also perhaps store some additional profiles that may matriculate in the future.

Likewise, the number or type of compute nodes may be selected to accommodate the processing requirements engendered by having 5000 employees, and may even assume a worst-case scenario in which all 5000 employees are using the system at once.

However, should the number of employees significantly increase (or even decrease) or should the computing needs fluctuate, in a persistent computing system, adding or subtracting resources to the computing system to respond to changes in demand may not be practical and can even prove to be costly for an organization. This can lead to the inefficient utilization of computing resources, because an architect has to build to deal with the worst-case and short duration loads of the system, rather than optimizing the system for the average load it may handle.

Persistent computing systems can also be problematic in scenarios in which a third-party creates and maintains a computing resource system that services clients from multiple entities in one system. Using the facial recognition example above, if the computing system 100 is configured to receive and process data from multiple parties, then the system may need to be configured to ensure that it is able to store data separately for each party, and that it must be configured to ensure that one party cannot have access to another party's data.

Furthermore, in a shared system that services multiple clients, it may be difficult to charge clients for use of the services, since it may be difficult to assess which client is using the computing nodes, and which clients should be charged for inefficient use of those nodes. Due to the inflexibility of a persistent computing system as described above, clients may have to bear the cost of paying for nodes that are typically statically configured to support the maximum demand case as described above.

In order to mitigate the issues described above with respect to persistent computing systems, in one or more examples, the computing systems described above can be implemented using a system that can build and maintain ephemeral cloud based computing resources to handle various computing needs.

Ephemeral computing services can describe computing resources that can be created, scaled up or down, and terminated in real-time based on the current demands facing the system. In other words, ephemeral computing resources can only remain in existence during the time they are needed and can be terminated once they are no longer needed. In one or more examples, an ephemeral computing system can be built using a cloud-based computing resource architecture. A cloud-based service can refer to on-demand computing resources that can be provisioned and maintained without direct active management by a user. In one or more examples, cloud-based services (provided by various cloud service providers) can provide shared computing resources that are spread or distributed over multiple locations and servers.

Referring to FIG. 1, the storage resources 106, as well as the compute nodes 104 can be implemented using a cloud-based service provider. In an alternative embodiment the storage resources 106 can be kept as a persistent system, while the compute nodes 104 are implemented in an ephemeral cloud-based system.

Figure 2:
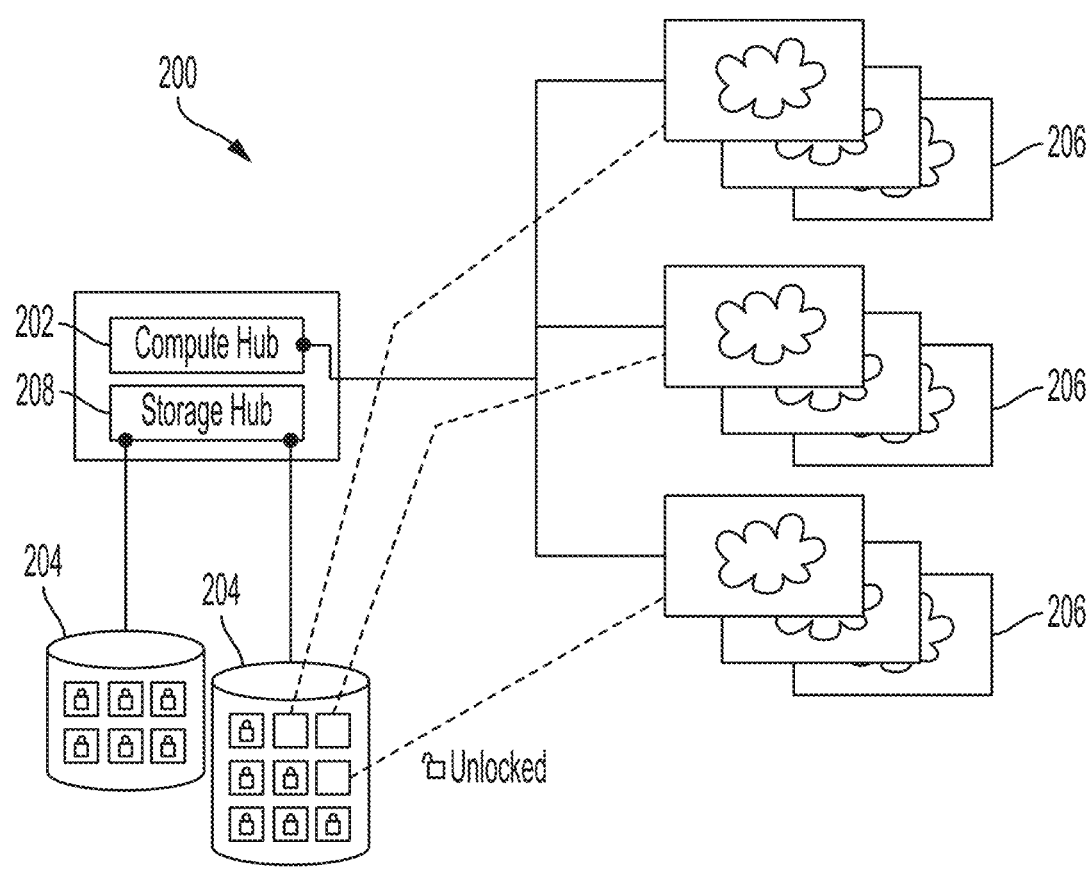
FIG. 2 illustrates an exemplary cloud-based ephemeral storage and computing environment according to examples of the disclosure.

FIG. 2 illustrates an exemplary cloud-based ephemeral storage and computing environment according to examples of the disclosure. Referring to FIG. 2, the system 200 can include a computing hub 202 that operates in substantially the similar way as described with hub 102 of FIG. 1. In one or more examples, the computing hub 202 can receive and ingest data from an external entity. An external entity can merely refer to another source computer that is seeking to transfer data to the system 200 so that the data can be stored, and the appropriate computing resources provisioned to handle the processing needs that the external entity expresses to the computing system 200. The method and format how an external entity expresses its processing needs to the computing system 200 is described below in detail.

In one or more examples, the computing hub 202 (i.e., a host) can be implemented itself using a cloud-based or virtual machine. The computing hub 202 can be configured to simplify the provisioning, management, and monitoring of on-demand computing nodes in virtual and cloud environments. The computing hub 202 can leverage cloud infrastructure to create host instances and can also be configured to provision and manage virtual or cloud-based computing nodes. In one or more examples, the computing hub 202 can be configured to use web-based user interfaces (UIs), command line interfaces (CLIs) as well as Representational State Transfer APIs (REST APIs) to convert processing instructions and computing needs into computing nodes capable of carrying out desired computing and data processing operations.

Once the data has been ingested by the computing system 200 at computing hub 202, the computing hub can store the data in one or more persistent data storage resources 204. Similar to the example of FIG. 1, persistent data storage resources 204 can be configured to store data provided to it by computing hub 202, and can also be configured to provide secure access to the data. In one or more additional examples, data storage resources 204 can also be configured to index the data in a manner that makes the data efficiently available to be called for processing by computing hub 202.

In one or more examples, the computing hub 202, in addition to receiving data from an external entity, can also receive one or more business processes from the external entity. A business process can refer to one or more specifications that define the types of data operations that are to be performed on the data. For instance, referring back to the facial recognition example described above, a business process can be transmitted to the computing hub 202 that states the types of processing and the parameters for processing the data stored in the data storage to implement a facial recognition application. Upon receiving the business process from the external entity, the computing hub 202 can use that information to created one or more cloud-based or virtual machine based computing nodes.

As briefly mentioned above, the computing system 200 can included one or more cloud based or virtual machine-based or Docker container based computing nodes 206. These computing nodes 206 can be provisioned and managed by computing hub 202. In one or more examples, computing hub 202 can create the computing nodes 206 using various public cloud infrastructure platforms such as Amazon Web Services (AWS), Microsoft Azure, and Google Cloud Platform (GCP.) In one or more examples the computing hub 202 can be "cloud agnostic" in that it does not mandate a preference for one cloud infrastructure platform or another. Instead, the computing hub 202 can take various factors into account when choosing which cloud service provider to implement a particular computing node on.

In one or more examples, one of the factors that computing hub 202 can take into account when choosing which cloud service provider to implement a particular computing node on can be user preference. For instance a particular client might have a preference of using a particular cloud service provider to implement their computing resources on. In such an instance, the computing hub 202 can simply ensure that the computing resources built for that particular client are all built on a particular cloud service provider platform.

In additional examples, the computing hub 202 can choose which cloud service provider to utilize for a particular computing node by analyzing the parameters associated with the one or more business processes that define what type of processing is to be implemented. For instance, if a particular type of processing is more efficiently handled using the computing resources of a particular cloud service provider, then the computing hub 202 (and specifically one or more programs/applications running in computing hub 202) can select that particular cloud service provider to implement the computing node 206. In this way, the computing hub 202 can remain cloud agnostic, and can implement computing nodes 206 across multiple cloud platforms.

As briefly described above each of the computing nodes 206 created by the computing system 200 can be ephemeral, meaning that they can be created and terminated based on the real-time needs of the business processes being implemented. Thus, in one or more examples, if a business process has concluded or has gone dormant, the computing system 202 can be configured to recognize this situation, and can be configured to terminate the business process based on the real-time need.

In the example, where a particular business process' real-time need has gone dormant, the computing system 200 can terminate the computing node that is implemented on a particular cloud service provider, but can also reinstate the computing node should the real-time need of the client engagement require it. In one or more examples, in addition to storing data, the computing system can also store schema information for each computing node it creates in response to a business process and one or more client preferences, and can use the stored schema information to reinstate the computing node should the need arise.

Separating data from computing resources can also lend itself to providing a computing system 200 with additional flexibility in terms of scaling up or down a particular computing node. In a standard enterprise Big data setup that uses persistent computing resources (such as those described above with respect to FIG. 1), the environment can be static with 500+ computing nodes running to accommodate various business computing needs. However, no system can be implemented as "one size fits all." The data for each user can be of different sizes, and the jobs/models/applications may have different needs and specifications. Additionally, various clients may have varying changing workloads over a particular engagement.

Thus in one or more examples, the computing system 200 can create ephemeral computing nodes as described above. In one or more examples, an ephemeral computing cluster can be initialized as a minimal configuration for each project and can be scaled up (i.e., have more computing resourced dedicated to the computing node) or scaled down (i.e., have less computing nodes dedicated to the computing node) based on the usage and real-time demand of a particular client. In one or more cases a computing node 206 of the computing system 200 can be deleted when not in use for some period of time (i.e., during holidays or other quiet periods.) When the period of inactivity ceases, the computing system 200 can be configured to recreate the computing node 206 as described above.

In one or more examples, by having the computing system 200 configured to auto scale the number of nodes (i.e., virtual machines) based on real demand, and auto downscale to the minimum nodes during periods of low activity, a client using such a system can save on the cost of paying for computing nodes that are typically statically configured to support the maximum demand. This feature can thus avoid paying for expensive computing nodes that are not in use.

As described above, the system 200 can be used to take in as inputs data and business processes from a user or client, and then be used to generate one or more computing resources based on those inputs. Also as described above, the system 200 can take in data and business processes from multiple users/clients and thus must ensure that the data is secure from unauthorized access (i.e., one client inadvertently or maliciously accessing another client's data). Also as described above, the business processes must ultimately be converted into computing resources.

In one or more examples of the disclosure, the system 200 can include a storage hub 208 that can be configured to arbitrate access between various ephemeral cloud-based computing resources 206 and the data store in the data storage resource 204. The storage hub can be configured to ensure that each computing node 206 is only granted access to the data for which the clients/engagements to which it is authorized.

Figure 3:
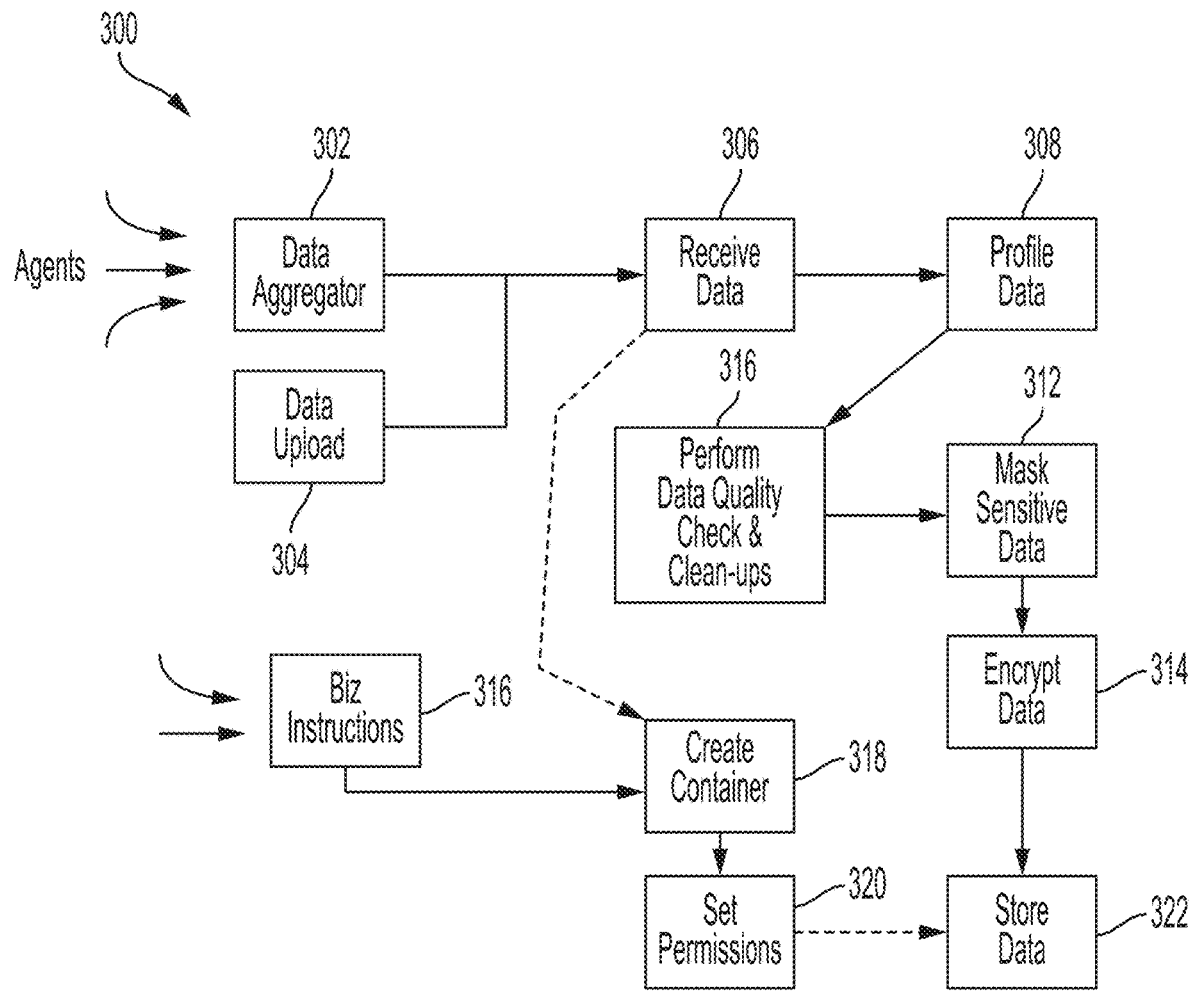
FIG. 3 illustrates an exemplary process for ingesting data and business processes from a client user according to examples of the disclosure.

FIG. 3 illustrates an exemplary process for ingesting data and business processes from a client user according to examples of the disclosure. In the example of FIG. 3, process 300 can be utilized to on-board (i.e., ingest data) and business processes provided to it from external users/clients. Thus, the process of 300 of FIG. 3 can illustrate the process of converting external data into data that is stored internally by computing system 200.

The process of ingesting data, and receiving business processing instructions can, in one or more examples, start out as parallel processes that eventually merge together with respect to storing the data ingested in a specific container. Thus, the process 300 can begin at step 302, wherein data from multiple sources belonging to a client can be aggregated into a single set of data.

In one or more examples, if the data can come from a single source in which case there may not be a need to aggregate the data. In such a scenario, the process can begin at step 304, wherein the data is directly uploaded to the computing hub 202. In any instance, whether the data is aggregated at step 302, or whether it is directly uploaded at step 304, the process can move to step 306 wherein computing hub 202 receives the data from the client.

Once the data has been received at step 306, the process can move to step 308, wherein the data is profiled. Profiling of data can refer to the process of identifying the source of the data. For instance in one or more examples, at step 308, the data can be inspected to determine the client to which the data belongs to, as well as the specific engagement pertaining to the client, for which the data belongs to.

Once the data has been profiled at step 308, the process can move to step 310 the computing hub performs an initial clean-up and quality check of the data. The cleaning up and quality check of data can refer the process of detecting and correcting (and in some instances removing) inaccurate, duplicated, or corrupt data from the data received from an external entity. In one or more examples, correcting or cleaning up data can also include cross checking the received data against a set of validated data and validating or correcting data values against the validated data.

Once computing hub 202 has performed the initial data quality checks and clean-ups at step 310, the process can move to step 312, wherein data that is marked as sensitive can be masked. Masking can refer to the process of hiding or obfuscating original data with modified content so that in the event that a malicious user gains access to the data, the data will not be useful to the malicious user. In one or more examples, masking can be performed using various known methods including: substitution, shuffling, number and date and variance, encryption, nulling, masking out, etc. Once sensitive data has been masked, the process can them move to step 314 wherein the masked data, as well as the non-masked data can be encrypted.

In parallel to the process described above, the computing hub 202 can also receive one or more business process instructions from an external entity. As described above, the business process instructions can reveal or describe the type of processing that the data received at step 316 is to undergo. Based on the received processing instructions received at step 316, the computing hub 202 can create partitions within the data storage resources 204. Thus, once the business processes have been received at step 316, the process can move to step 318 wherein containers are created based on the received business processes. A container can refer to a specific partitioned area within a data storage resource that is dedicated to storing the data associated with a specific client engagement. Thus, in the example of FIG. 3, the business process instructions received at step 316 can be associated with one or more client engagements. Based on the engagements found to be associated with the business instructions received a step 316, the computing hub 202 and/or the storage hub 208 can be utilized to create one or more containers at step 318, with each container associated with a specific client engagement.

Once the one or more containers associated with business process instructions have been created at step 318, the process 300 can move to step 320, wherein permissions are created for each container. The permissions created at step 320 can specify which entities are allowed access to the data. This feature thus can allow for secure access to the data by preventing non-authorized users or entities from accessing the data. In one or more examples, the storage containers can be secured from unauthorized access by implementing a token system that is described in detail below.

Once the containers have been created and appropriately permissioned at steps 318 and 320, the data encrypted at step 314 can be stored at step 322 in the containers created based on the business processing instructions received at step 316.

Figure 4:
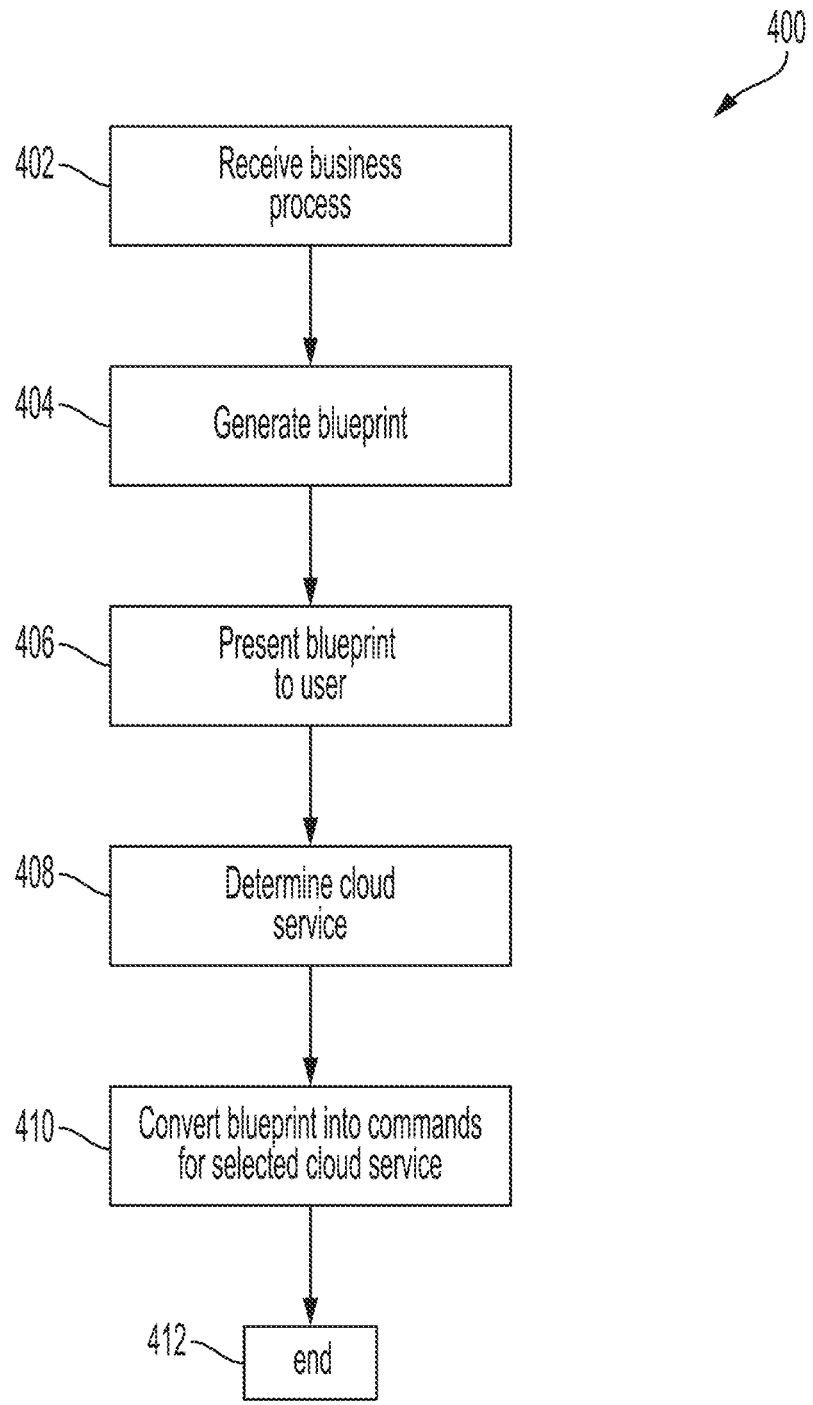
FIG. 4 illustrates an exemplary process for converting business processes received from a client user to one or more cloud-based computing resources according to examples of the disclosure/

As discussed above, at step 316, the computing hub can receive and store various business processes transmitted by an external entity or client. Also as previously discussed, the computing system 200 can be configured to convert the received business processes into one or more cloud-based computing nodes 206. FIG. 4 illustrates an exemplary process for converting business processes received from a client user to one or more cloud-based computing resources according to examples of the disclosure.

In the example of FIG. 4, the process 400 can begin at step 402 wherein one or more business processes are received from an external entity or client. Step 402 of process 400 can correspond to step 304 of FIG. 3 as described above. Once the business process has been received at step 402, the process can move to step 404 wherein one or more blueprints are generated based on the received business processes. In one or more examples, a blueprint in the context of the systems and methods of the disclosure, can refer to a specification of a computing cluster.

At step 404, the computing hub 202 can select one or more blueprints (i.e., pre-formed specifications of computing nodes) based on various factors found in the business processes. In one or more examples, the computing node blueprints can be selected based on various factors associated with a business process such as complexity, amount of computing resources required, fluctuation in computing resources (i.e., how much will the node have to scale up or down) and other factors. As discussed above, at step 406, the computing hub 202 can select multiple blueprints and as discussed below, allow the user of the system to choose the blueprint they desire.

Once the blueprints to implement a business process have been selected, the process can move to step 406 wherein the selected blue prints are presented to the user of the computing system 200. In one or more examples at step 406, the user can select a blueprint that they wish to see be utilized to implement a cloud based computing node. In or more examples, in addition to selecting a blueprint to implement a computing node, the user may also specify one or parameters that can be further used by the system to configure the node using the selected blueprint. As discussed above, the user may select the blueprint and/or provide parameters via a GUI or other user interface.

Once the blueprint has been presented to the user and selected at step 406, the process 400 can move to step 408 wherein the cloud service provider at which the computing node is to be implemented can be chosen. As discussed above, the computing system 200 can be cloud service agnostic in that it can create and maintain multiple computing environments across multiple cloud service providers, and can decide which cloud-based service provider to utilize based on the client's requirements or other factors. Thus at step 408, the computing hub 202 can choose which cloud service provider to utilize based on the blueprint selected by a user of the system as well as the parameters for the computing node specified by the user.

In one or more examples, once the cloud service has been determined at step 408, the process can move to step 410 wherein the blueprint is converted in one or more commands that can be transmitted to the cloud service provider for implementation of the computing node. In one or more examples, each individual cloud computing platform/provider may have a unique or distinct syntax for specifying computing infrastructure to be built on the platform. Thus, in one or more examples, at step 410, the computing hub 202 can convert the blueprint into one or more commands in a syntax that corresponds to the cloud service provider selected at step 408. Once the blueprint has been converted into commands for a cloud based computing platform, the process can then move to step 412 wherein the process is terminated.

In addition to creating ephemeral cloud-based computing resources based on business processes, a user of the system 200 depicted in FIG. 2 and described may additionally want to have the ability to track what transactions the data that they stored in the computing system 200 underwent over its lifetime in the system. This type of history can be referred to as the "lineage" of the data. By tracking the lineage of a data set, a user of the computing system can quickly ascertain what processes and analyses the data they have transmitted to the system underwent over its lifetime. Providing reverse traceability as to how (what steps, what processes) and who (what user or system) were involved in getting a certain dataset to its current state can explain the different processes involved in the data flow and their dependencies.

In order for computing system 200 of FIG. 2 to track lineage information, in one or more examples, the system can be configured to capture enterprise dataflow as metadata, and the computing system can be configured to manage the metadata associated with lineage information so that a user can access it in an efficient manner. Furthermore, the computing system 200 can be configured to use the metadata captured as part of the lineage information so as to generate a visual report that can show the user how the data in the their data set has been processed over its lifetime.

Figure 5:
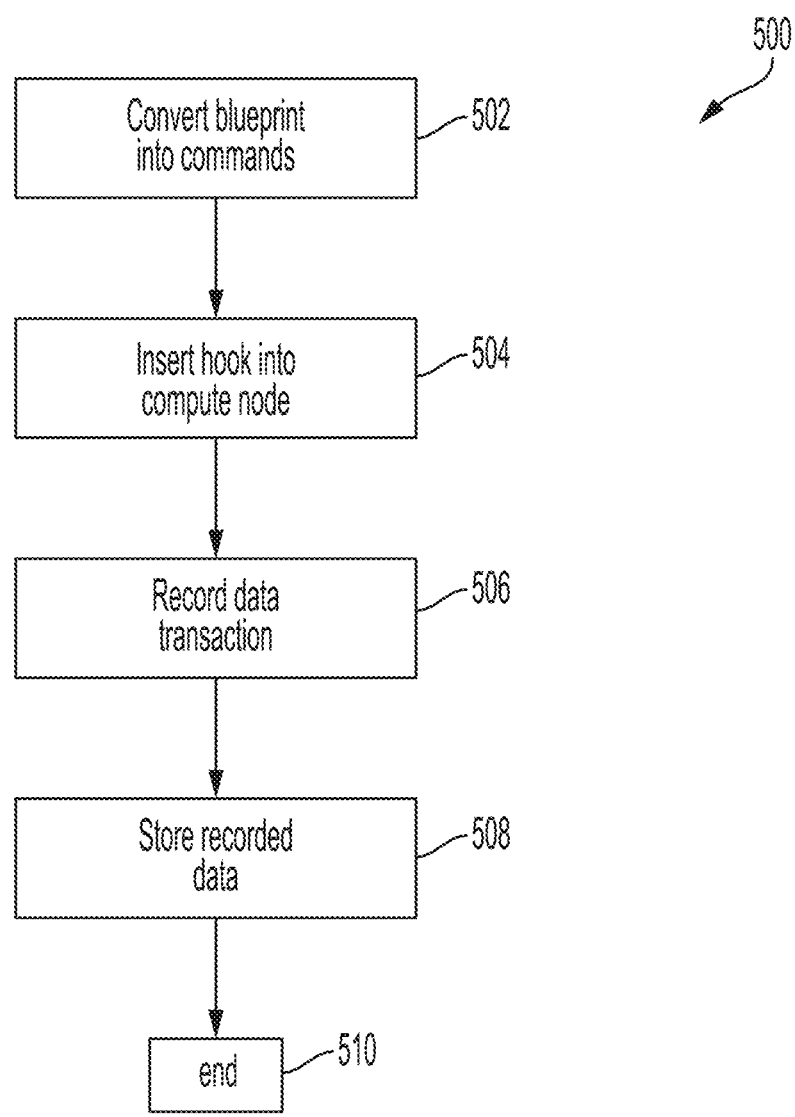
FIG. 5 illustrates an exemplary process for tracking the versions and lineage of data stored and processed in an ephemeral computing environment according to examples of the disclosure.

FIG. 5 illustrates an exemplary process for tracking the versions and lineage of data stored and processed in an ephemeral computing environment according to examples of the disclosure. In the example of FIG. 5, the process 500 can begin at step 502, wherein a blueprint (discussed above) can be converted into commands for a cloud service provider to generate a computing node. In one or more examples, step 502 can correspond to step 410 of FIG. 4 and thus the details regarding step 502 can be found above with respect to the discussion of step 410 of FIG. 4.

Once the blueprints have been converted into cloud service provider commands at step 502, the process can move to step 504 wherein one or more hook functions can be created (through the use of the same commands that are used to generate the computing node.) In other words, in addition to creating the computing node, the computing system 200 can attach one or more hooks to each computing node, and each hook can be configured to record lineage data about the types of processing that is being done at each computing node and the source of the data upon which the processing is occurring.

In one or more examples, the hooks that are attached to each computing node can record metadata about each transaction taking place on the data that the computing node is processing, and transmit that information to a metadata repository located within the computing system 202. In one or more examples, the metadata repository can be stored within the container stored within data storage resource 204 of the entity to which the computing node belongs. In one or more examples, the hooks can record the identity of the data acting as an input to the computing node, the type or character of the processing/analysis being stored in the data and then store the lineage information in the appropriate metadata repository.

In one or more examples, the lineage information can be stored in the form of a spreadsheet or csv file, with each row in the spreadsheet corresponding to a different transaction being performed on the data. Thus one row of the spreadsheet can correspond to a transaction, and can include such info as the identity of the input data, the type and character of the transaction being performed on the data, and the identity of the output data and where it was stored.

Once the hooks have been created at step 504, the process can move to step 506 wherein the hooks are used to record the data transactions as described above. As discussed above, the data can be recorded in spreadsheet form or using a csv file. Once the data has been recorded at step 506, the process can then move to step 508 wherein the recorded data is stored in a metadata repository as described above. Finally, once all the transactions have been recorded, the process 500 can move to step 510 wherein the process is terminated.

In one or more additional examples, the metadata collected by the hooks described above with respect to FIG. 5 can be used to generate a visualization at the request of the user. In one or more examples, a user of the computing system 200 can request a visualization of the entire lineage (or a partial lineage) of a particular set of data, and the computing system 200 can use the lineage data recorded by the hooks and stored in the metadata repository to generate a visualization that can inform the user as to the various transactions that the data went through.

Figure 6:
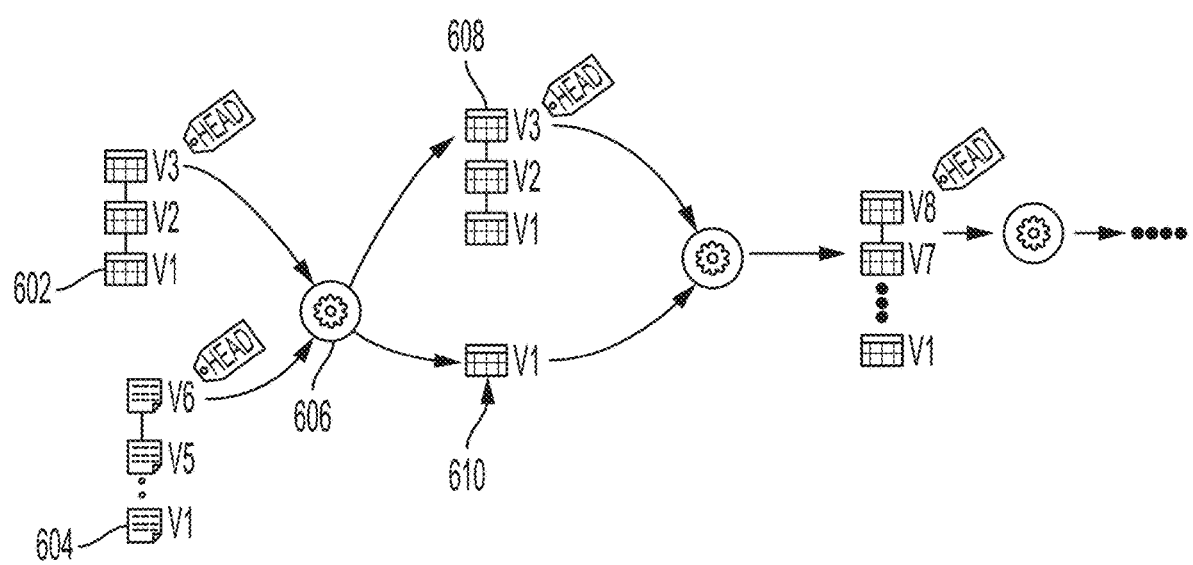
FIG. 6 illustrates an exemplary data lineage visualization according to examples of the disclosure.

FIG. 6 illustrates an exemplary data lineage visualization according to examples of the disclosure. In the example of FIG. 6, the graphic 600 can visualize one or more inputs to a process (i.e., inputs 602 and 604), one or more processes performed on the input (i.e., process 606), and can illustrate one or more outputs of a process (i.e., outputs 608 and 610.) The graphic 600 of FIG. 6 can thus provide an illustration of the lineage of the data in a manner that can be readily understood by a user of the computing system 200. In one or more examples, the visualization 600 can also include version information, showing various versions of a data input or output as shown in FIG. 6.

As outlined in the disclosure above, the systems and methods described above can provide a robust platform by which a user can provide their data and business processes to a computing system that can turn those inputs into a cloud-based computing architecture to effect those business processes. As described above, the computing platform can be configured such that it is cloud vendor agnostic. Each computing node can be provisioned, and the system can monitor each node for usage so as to scale up or scale down each computing node based on real-time demand of the system. By providing the ability to scale up or scale down or even terminate various computing nodes over the life of an engagement, the system can provide on-going cost reduction to its clients by allowing them to only utilize the computing resources they need.

Additionally, the system can provide an efficient method of allocating costs between various users of the system, by having each computing node reserved for the computing needs of each client/user of the system. Finally, the system can also produce data lineage information that can be stored and then accessed by a user to create visualizations of the types and character of transactions that have been performed on the data set over the course of an engagement.

As discussed above, so as to ensure data security, the data storage resources 204 of FIG. 2 can be implemented using persistent physical hardware while the computing nodes can be implemented on cloud-based virtual machines. Since the data is stored in a persistent while the hardware used to process the data is implemented in a cloud-based computing resource, the cloud based system may need to have efficient access to the persistent data storage resource ("data store.")

Furthermore, in one or more examples, a computing system such as the one described above, may be operating on data sets and maintaining computing nodes of multiple clients simultaneously. One client of the system may desire to not have their data accessible to other clients within the system, nor have their data inadvertently shared with other clients using the computing system. Thus, in one or more examples, the system described above with respect to FIG. 2 can include various features (described below) to arbitrate access to persistent data stores from cloud-based computing resources.

As an example, one of the features that the computing system 200 can include to ensure secure and efficient access is to include a system and method for preparing and organizing the data in the persistent data store in such a manner so as to make access to that data efficient, while at the same time only allowing for access of data belonging to a particular user. In order to ensure that data is secure (i.e., not accessible to malicious users, and does not propose a threat to the persistent data source), in one or more examples, the data can be received in a first data store that is only accessible by computing resources that are internal to computing system 200, processed to ensure that the data is safe, and then transmitted to a second data store (i.e., a second persistent data storage resource) that is accessible by one or more cloud-based computing resources for processing.

Figure 7:
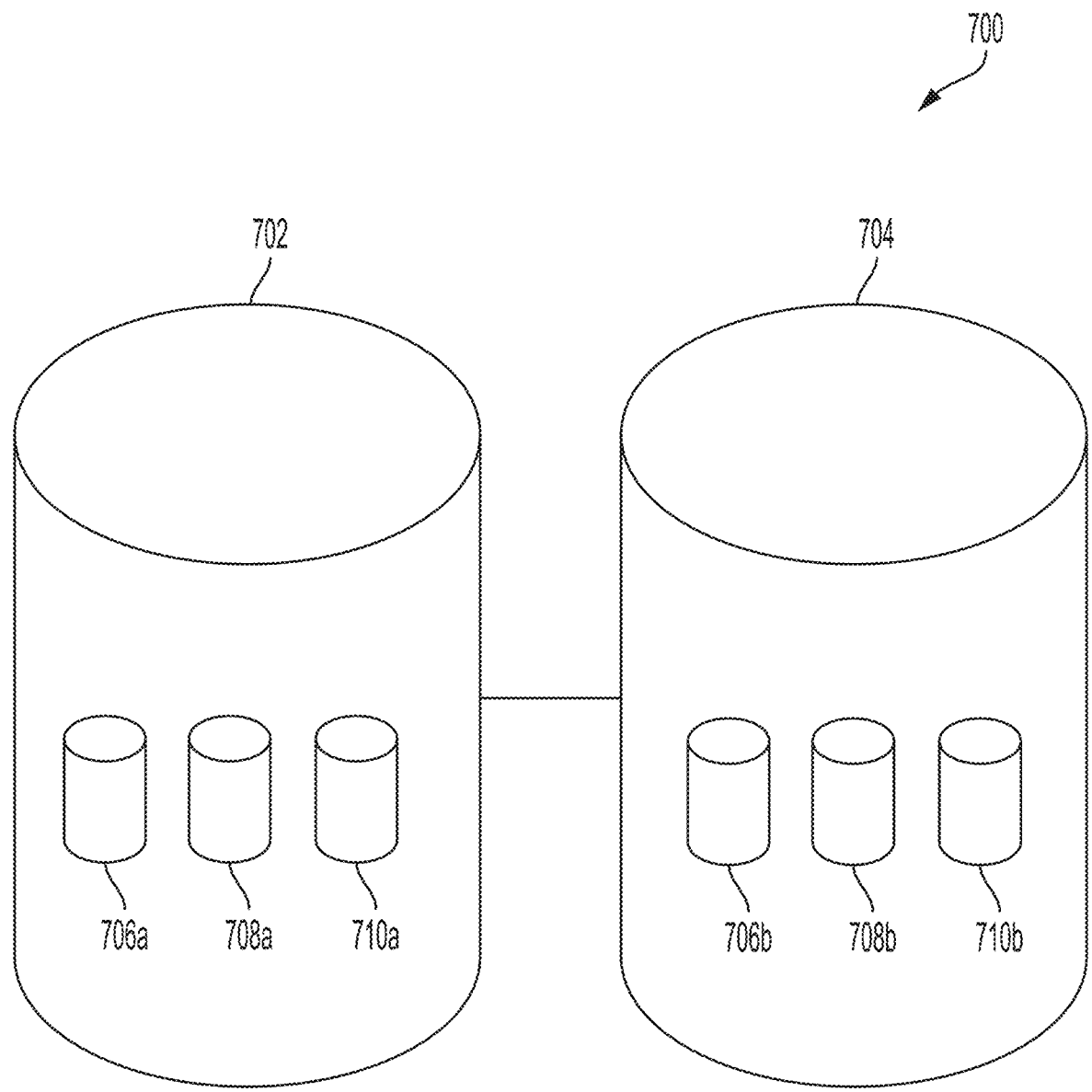
FIG. 7 illustrates an exemplary persistent data storage resource system according to examples of the disclosure.

FIG. 7 illustrates an exemplary persistent data storage resource system according to examples of the disclosure. In the example of FIG. 7, the data store 700 can correspond to either of the persistent data storage resources 204 depicted in FIG. 2. The data store 700 of FIG. 7 can include two isolated for data storage, a first data store zone 702, and a second data store zone 704.

The first data store zone 702 can be configured such that it is write only meaning that the data store zone can only be written to but cannot be read by any external entity. In one or more examples, the first data store zone 704 can be configured such that it is only accessible by computing resources that are internal to the computing system 200 (i.e., computing hub 202.) The data store zone 702 can be configured to include one or more storage accounts. In the example of FIG. 7, the first zone 702 can include three separate storage accounts 706a, 708a, and 710a. In one or more examples, each storage account 706a, 108a, and 710a can correspond to the data belonging to a single client that is utilizing the computing system 200 of FIG. 2. Thus in the example of FIG. 7, containers 706a, 708a, and 710a, can correspond to the data of three separate clients.

The data store 700 of FIG. 7 can also contain a second data store zone 702. The second data store zone 702 can be configured to have read and write access so that one or more cloud-based computing resources can access the data stored within it, as well as write new data into it. In one or more examples, the data stored in the first data zone 702 can be transferred to the second data zone 704, once the data has been organized and prepared for secure access by one or more computing nodes. Like first data zone 702, the second data zone 704 can include one or more containers 706b, 708b, and 710b. Containers 706b, 708b, and 708c can correspond to the data that was stored in containers 706a, 708a, and 710a respectively, and thus each container in data zone 704 can correspond to an individual clients data. Configuring and partitioning a data store in the manner depicted in FIG. 7, can allow for sensitive data to be de-identified (i.e., masked) by system processes, and can allow for a general user/application to access the data.

Figure 8:
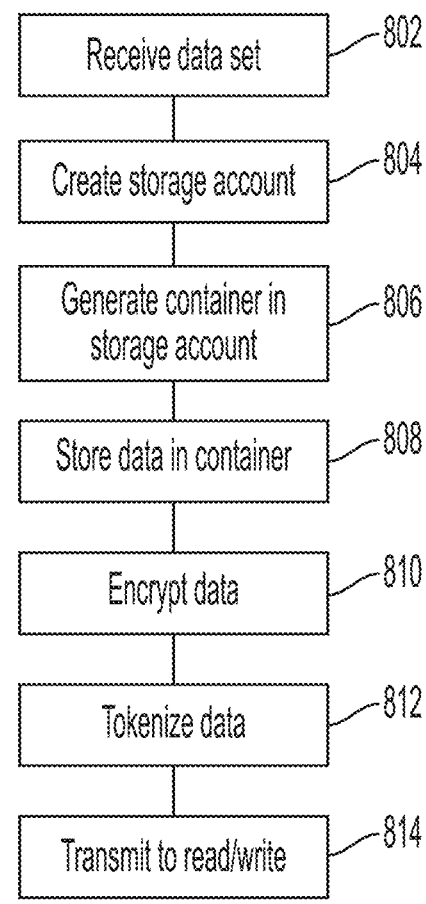
FIG. 8 illustrates an exemplary process for receiving data from an external entity according to examples of the disclosure.

FIG. 8 illustrates an exemplary process for receiving data from an external entity according to examples of the disclosure. The example of FIG. 8, can be performed using the data store 700 discussed above with respect to FIG. 7. In the example of FIG. 8, the process 800 can begin at step 802 wherein a data set can be received from an external entity. In one or more examples, step 802 of FIG. 8 can correspond to step 302 of FIG. 6.

Once the data has been received at step 802, the process can move to step 804 wherein a storage account can be created within the data zone 702. A storage account can refer to a partition in a persistent data store that can correspond to a client's data. In other words, each storage account can belong to a single entity that operates on the computing system 202. As discussed further below, each storage account can contain one or more containers, wherein each container contains the data from a single client engagement. In one or more examples, a client using the computing system 200 may already have a preexisting storage account due to prior use of the computing system. In such an instance, the process 800 may bypass step 804 as a storage account pertaining to that particular client may already exist.

Once a storage account has been created at step 804, the process can move to step 806 wherein a container is created within each storage account that pertains to a particular engagement of a client. In one or more examples, a particular client or entity may use computing system 200 for multiple engagements. An engagement can refer to a set of business processes that pertain to the processing of a particular data set. As an example, a company (i.e., a client) may have a set of business processes that are dedicated to facial recognition analysis (as described above) and a separate set of business processes dedicated to a different data analytics process. Each set of business processes can be labeled as a separate engagement, and the data pertaining to each engagement can be stored within a separate container with a storage account. In one or more examples, a container can refer to a partition of memory space within a storage container that is dedicated to a specific data set that pertains to a specific engagement of a client.

Once the appropriate containers within a storage account have been generated at step 806, the process can move to step 808, wherein the data received at step 802 can be stored in the container that has been specifically created for the engagement at step 806. By generating and storing data for a particular engagement within a specific container, access to that data can be arbitrated at the container level, meaning that data from one engagement can have access to it blocked from other engagements or other clients. As an example, if access to data was arbitrated at the storage container level, this could mean that one engagement of a client could inadvertently or maliciously access the data of another engagement. Such a scenario could compromise the security of an engagement's data and thus make the overall data integrity of the system less secure.

Once the data has been stored in the individual containers at step 808, the process can move to step 810, wherein the data can be virus scanned, and analyzed to see if the data can pass basic sanity checks (i.e., not corrupt, filename suffix matches actual file type, approved filename formats.) Furthermore at step 810, the data can also be encrypted so that it can be transmitted from the persistent data store to cloud-based computing nodes securely.

Once the data has been encrypted at step 810, the process can move to step 812 wherein access to the data can be tokenized. Tokenization can refer to the process of mapping data to a non-sensitive equivalent referred to as a token. Thus, tokens can be transmitted rather than the data itself, and the data itself can be accessed only when an external entity provides the token to the data store for access. Thus, in one or more examples, at step 810, tokens that refer back to the data stored in a data can be created, and can be distributed (as discussed in further detail below) to external entities in a secure manner that verifies that the entity requesting the token has a limited ability to access the data.

Once the data has been tokenized at step 812, the process can move to step 814 wherein the data contained in the first data zone 702 of the persistent data store 700 can be transferred to the second data zone 704. As previously described above, the second data zone 704 can have read/write access, and thus can be used by external computing resources such as the cloud based computing nodes 206 of the system 200 in FIG. 2 to get access to the data. Therefore, the files located in the second data zone 704 can be referred to as the "gold master" meaning this data is what the analysis tools and computing nodes can use to perform its data analysis operations.

As discussed above the second data zone 704 can be organized in the same manner as the first data zone 702. Thus, in one or more examples, the second data zone 704 can be organized in storage accounts corresponding to a specific client, and each storage account can include one or more storage containers pertaining to each engagement of a client. In one or more examples, the second data zone 704 can be further configured to include a mechanism by which to arbitrate access to the data stored within the second data zone.

Figure 9:
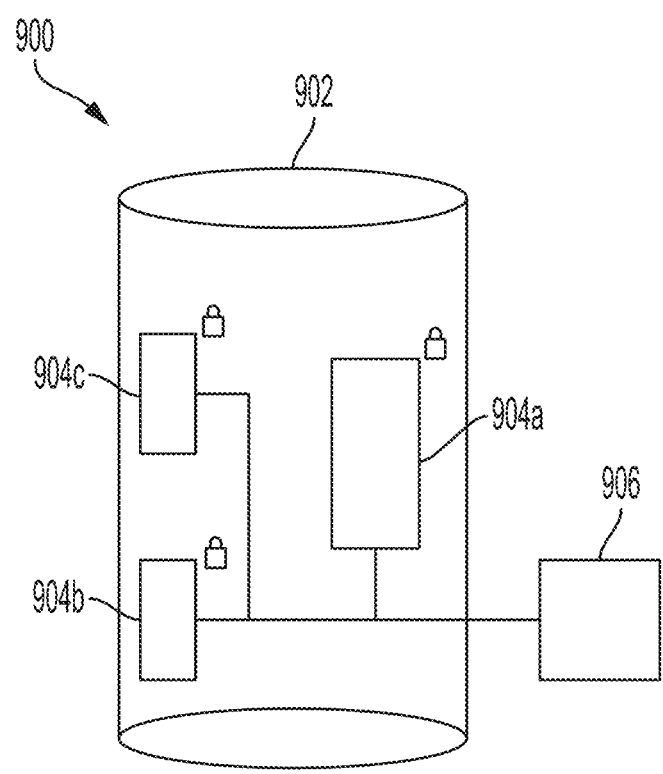
FIG. 9 illustrates an exemplary persistent data storage zone configured to arbitrate access to one or more external computing nodes according to examples of the disclosure.

FIG. 9 illustrates an exemplary persistent data storage zone configured to arbitrate access to one or more external computing nodes according to examples of the disclosure. In the example of FIG. 9, the persistent data storage zone 900 can correspond to the second data zone 704 of FIG. 7. Thus in one or more examples the data storage zone 900 can include a data storage container 902, that contains one or more storage containers 904a, 904b, and 904c. The data storage account 802 can also include a "vault" 906 that can be configured to arbitrate access to each of the containers 904a, b, and c via the use of tokens.

In one or more examples, the vault 906 can receive access requests for data from a cloud-based computing node and then issue one or more tokens to the cloud-based computing node for access to the appropriate storage container. In order to ensure secure access by the computing node and not a malicious user or another entity who may later acquire the node from the legitimate computing node, the vault 906, in one or more examples, can note the IP address of the computing node, and configure the token so that it only grants access to the data from the IP address corresponding to the computing node.

Furthermore, in one or more examples, the vault 906 can issue the token to a computing node for a limited duration of time. For instance, in one or more examples, the vault 906 can issue the token for a duration of 24 hours. As the computing node performs its processing, in one or more examples, the vault can monitor the amount of time left on the token, and can automatically renew the token on behalf of the computing node. In this way, the computing node that is accessing the data stored in the storage container can have seamless access to the data without having to renew the node or see any interruptions in access to the data due to expiring tokens.

Figure 10:
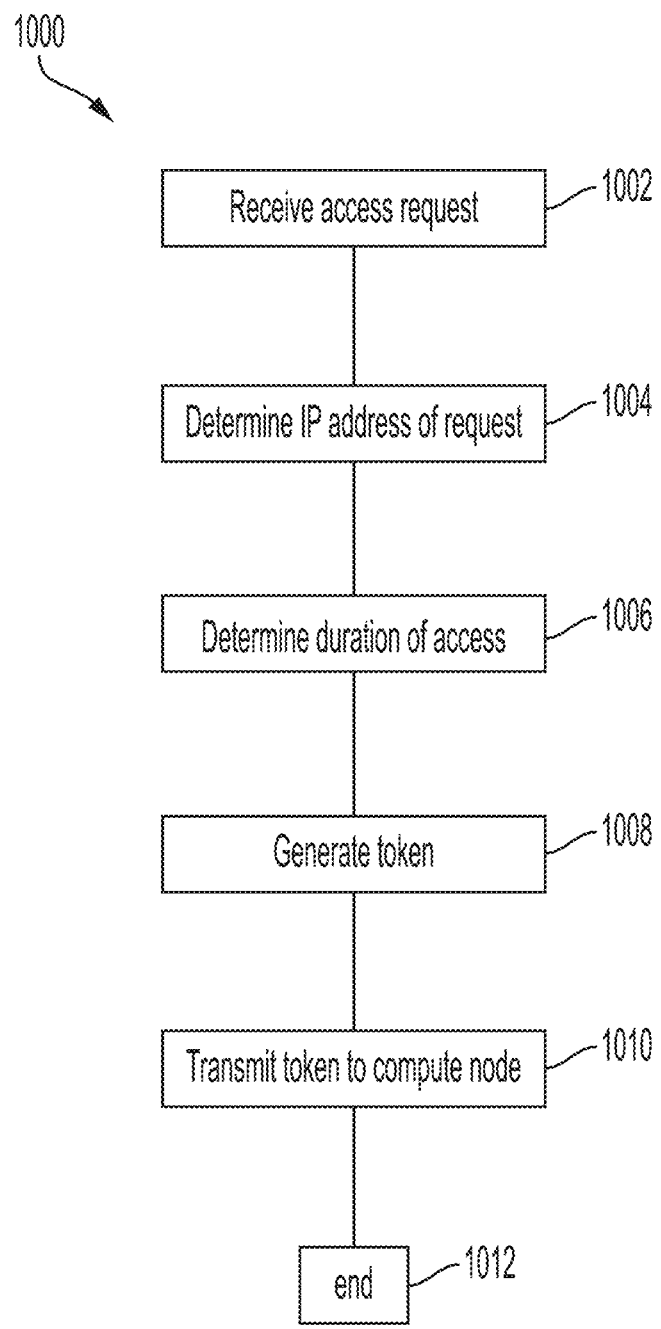
FIG. 10 illustrates an exemplary process for generating access tokens for use by a computing node according to examples of the disclosure.

FIG. 10 illustrates an exemplary process for generating access tokens for use by a computing node according to examples of the disclosure. The process 1000 of FIG. 10 can be performed by the vault 906 described above with respect to FIG. 9.

In the example of FIG. 10, the process 1000 can begin at step 1002 an access request to data can be received by the vault 906 from a cloud-based computing node that is seeking access to the data in a particular container stored in a particular storage container. Once the access request has been received at step 1004, the process can move to step 1004 wherein an IP address associated with the request from the computing node can be determined.

Since cloud-based computing nodes are implemented in remote servers or virtual machines that are maintained in remote locations away from the computing system 200, each cloud-based computing node can communicate with the computing system using a TCP/IP protocol. Therefore each computing node that is part of computing system 200 may have an IP address associated with it. The IP address of a computing node can be used as an identifier that the vault 906 can use to ensure that access to the a particular data set stored within a container is granted to a legitimate user of that data. Using the IP address of a computing node to arbitrate access to a particular storage container can also ensure that once a particular computing node has died (i.e., been terminated) the token used to grant that computing node cannot be later used by another entity to grant unauthorized access to the data. In other words, the access to the data can die with the termination of a computing node.

Once the IP address of a particular request is determined at step 1004, the process can move to step 1006 wherein the vault 906 can determine the duration of time in which the token will be valid. Limiting the duration of time that a token can remain valid can add an extra layer of security by ensuring that should the token be maliciously used by another entity not authorized to access the data, the damage that can be potentially done to the data, or the amount of time that the malicious user can access the data can be limited.

Once the duration of access has been assigned at step 1006, the process can move to step 1008 wherein an access token to the data can be generated by the vault 906. As described above, the token can also include IP address and duration of time information so as to ensure only legitimate use of the token by a legitimate computing node needing access to the data.

Once the token has been generated at step 1008, the process can move to step 1010 wherein the token can be transmitted to the appropriate computing node seeking access to the data. Finally, once the token has been transmitted at step 1010, the process can be terminated at step 1012.

As described above, the vault 906 can monitor the duration of access given to each node, and can automatically renew the node using the process outlined with respect to FIG. 10. Thus, in the systems and methods described above, data maintained by a computing system that uses cloud-based computing nodes to implement data analysis on large and complex data sets can ensure the integrity and security of the data to be operated on by storing the data in a secure and persistent data storage medium, and using a system of tokens to ensure that only the computing nodes belonging to a particular client engagement has access to only the data stored in a storage container that belong to the engagement.

Figure 11:
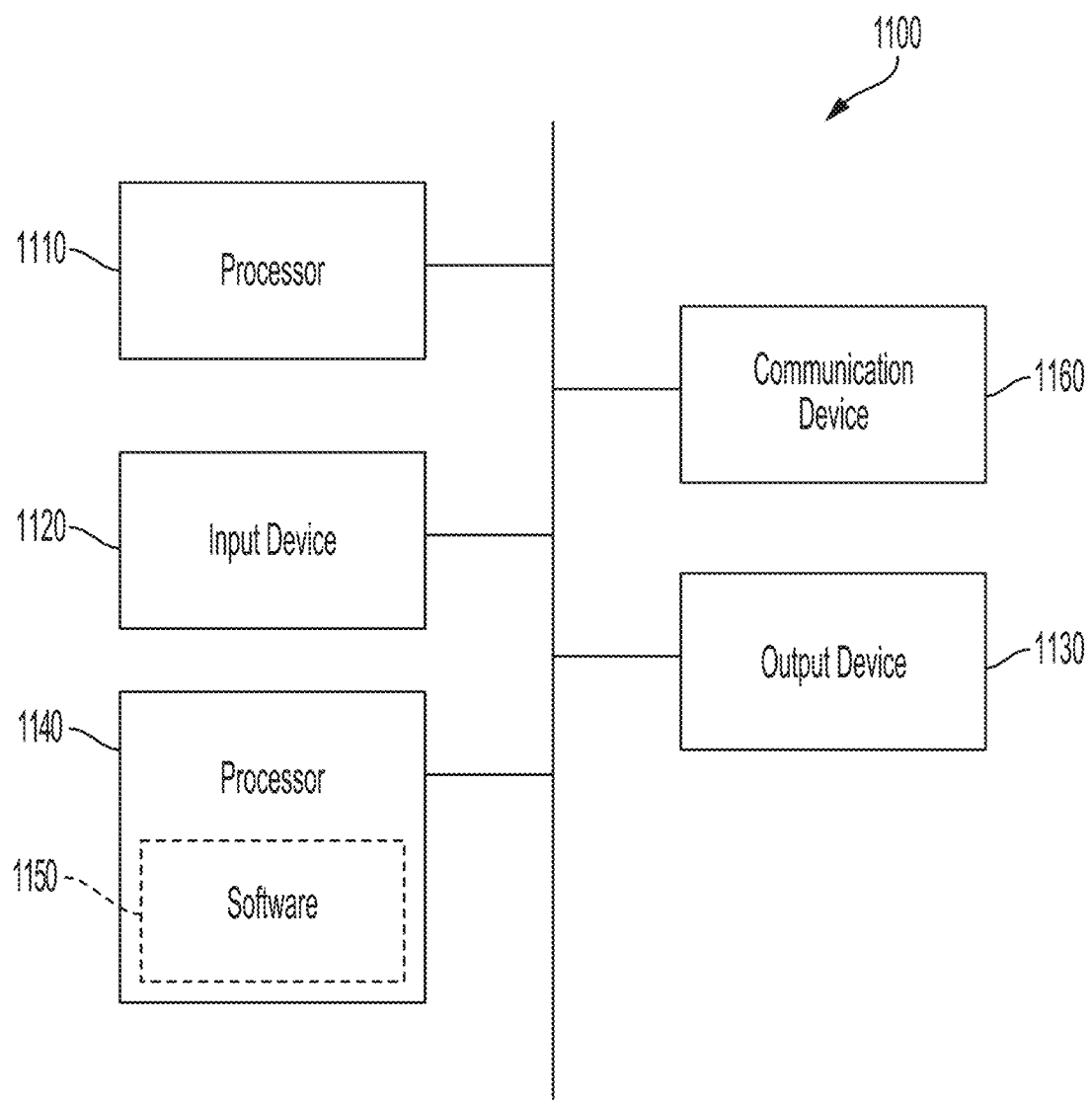
FIG. 11 illustrates an example of a computing device in accordance with one embodiment of the disclosure.

FIG. 11 illustrates an example of a computing device in accordance with one embodiment. Device 1100 can be a host computer connected to a network. Device 1100 can be a client computer or a server. As shown in FIG. 11, device 1100 can be any suitable type of microprocessor-based device, such as a personal computer, work station, server, or handheld computing device (portable electronic device) such as a phone or tablet. The device can include, for example, one or more of processor 1110, input device 1120, output device 1130, storage 1140, and communication device 1160. Input device 1120 and output device 1130 can generally correspond to those described above and can either be connectable or integrated with the computer.

Input device 1120 can be any suitable device that provides input, such as a touchscreen, keyboard or keypad, mouse, or voice-recognition device. Output device 1130 can be any suitable device that provides output, such as a touchscreen, haptics device, or speaker.

Storage 1140 can be any suitable device that provides storage, such as an electrical, magnetic, or optical memory including a RAM, cache, hard drive, or removable storage disk. Communication device 1160 can include any suitable device capable of transmitting and receiving signals over a network, such as a network interface chip or device. The components of the computer can be connected in any suitable manner, such as via a physical bus, or wirelessly.

Software 1150, which can be stored in storage 1140 and executed by processor 1110, can include, for example, the programming that embodies the functionality of the present disclosure (e.g., as embodied in the devices described above).

Software 1150 can also be stored and/or transported within any non-transitory, computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1140, that can contain or store programming for use by or in connection with an instruction-execution system, apparatus, or device.

Software 1150 can also be propagated within any transport medium for use by or in connection with an instruction-execution system, apparatus, or device, such as those described above, that can fetch instructions associated with the software from the instruction-execution system, apparatus, or device and execute the instructions. In the context of this disclosure, a transport medium can be any medium that can communicate, propagate, or transport programming for use by or in connection with an instruction-execution system, apparatus, or device. The transport readable medium can include, but is not limited to, an electronic, magnetic, optical, electromagnetic, or infrared wired or wireless propagation medium.

Device 1100 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 1100 can implement any operating system suitable for operating on the network. Software 1150 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Therefore, according to the above, some examples of the disclosure are directed to a method for providing secure access to data stored on a computing resource to one or more cloud-based computing resources, the method comprising, receiving a data set, generating one or more data containers within a first computing resource based on the received one or more processing instructions, storing the data set in the one or more containers within the first computing resource, receiving one or more requests from a second computer resource that are provisioned on one or more cloud-based computing platforms for access to the data set stored in the one or more containers within the first computing resource, generating one or more tokens for access to the data set stored in the in the one or more containers within the first computing resource, wherein the generated tokens are based on one or more parameters associated with the second computing resource that is provisioned on one or more cloud-based computing platforms, and transmitting the one or more tokens for access to the data set stored in the in the one or more containers within first computing resource to the second computing resource. Additionally or alternatively to one or more examples disclosed above, the one or more parameters includes an IP address of the second computing resource that transmitted the request, and wherein generating one or more tokens for access to the data set to the data set stored in the in the one or more containers within the first computing resource includes generating the one or more tokens for access to the data set based on the IP address of the request. Additionally or alternatively to one or more examples disclosed above, the generating one or more tokens for access to the data set to the data set stored in the in the one or more containers within the first computing resource includes determining a duration of time for allowing access to the data set and generating the one or more tokens for access to the data set based on the determined duration of time for allowing access to the data set. Additionally or alternatively to one or more examples disclosed above, the method further comprises renewing the generated token when it is determined that the determined duration of time will expire within a predetermined amount of time. Additionally or alternatively to one or more examples disclosed above, the method further comprises generating a storage account within the first computing resource based on a source of the received data set. Additionally or alternatively to one or more examples disclosed above, the method further comprises generating a storage container within the storage account based on an identified engagement from the source of the received data set. Additionally or alternatively to one or more examples disclosed above, the method further comprises storing the received data set in the generated storage container. Additionally or alternatively to one or more examples disclosed above, the method further comprises encrypting the data set stored in the generated storage container. Additionally or alternatively to one or more examples disclosed above, the method further comprises encrypting the data set. Additionally or alternatively to one or more examples disclosed above, the method further comprises receiving one or processing instructions, wherein the one or more processing instructions corresponds to the received data set and includes one or more processing tasks to be performed on the received data set. Additionally or alternatively to one or more examples disclosed above, the method further comprises generating a second computing resource on one or more cloud-based computing platforms based on the received one or more processing instructions. Additionally or alternatively to one or more examples disclosed above, receiving one or more requests from the second computing resource for access to the data set stored in the in the one or more containers within the first computing resource includes receiving requests from the second computing resource, wherein the requests are based on the received one or more processing instructions. Additionally or alternatively to one or more examples disclosed above, the first computing resource is a physical storage device that is maintained by a single user.

Other examples of the disclosure are directed to a system for providing secure access to data stored on a computing resource to one or more cloud-based computing resources, the system comprising, one or more processors, a memory, and a first computing resource, wherein the one or more processors are configured to execute instructions stored on the memory that cause the system to, receive a data set, generate one or more data containers within the first computing resource based on the received one or more processing instructions, store the data set in the one or more containers within the first computing resource, receive one or more requests from a second computer resource that are provisioned on one or more cloud-based computing platforms for access to the data set stored in the one or more containers within the first computing resource, generate one or more tokens for access to the data set stored in the one or more containers within the first computing resource, wherein the generated tokens are based on one or more parameters associated with the second computing resource that is provisioned on one or more cloud-based computing platforms, and transmit the one or more tokens for access to the data set stored in the in the one or more containers within first computing resource to the second computing resource. Additionally or alternatively to one or more examples disclosed above, the one or more parameters includes an IP address of the second computing resource that transmitted the request, and wherein generating one or more tokens for access to the data set to the data set stored in the in the one or more containers within the first computing resource includes generating the one or more tokens for access to the data set based on the IP address of the request. Additionally or alternatively to one or more examples disclosed above, the generating one or more tokens for access to the data set to the data set stored in the in the one or more containers within the first computing resource includes determining a duration of time for allowing access to the data set and generating the one or more tokens for access to the data set based on the determined duration of time for allowing access to the data set. Additionally or alternatively to one or more examples disclosed above, the method further comprises renewing the generated token when it is determined that the determined duration of time will expire within a predetermined amount of time. Additionally or alternatively to one or more examples disclosed above, the method further comprises generating a storage account within the first computing resource based on a source of the received data set. Additionally or alternatively to one or more examples disclosed above, the method further comprises generating a storage container within the storage account based on an identified engagement from the source of the received data set. Additionally or alternatively to one or more examples disclosed above, the method further comprises storing the received data set in the generated storage container. Additionally or alternatively to one or more examples disclosed above, the method further comprises encrypting the data set stored in the generated storage container. Additionally or alternatively to one or more examples disclosed above, the method further comprises encrypting the data set. Additionally or alternatively to one or more examples disclosed above, the method further comprises receiving one or processing instructions, the one or more processing instructions corresponds to the received data set and includes one or more processing tasks to be performed on the received data set. Additionally or alternatively to one or more examples disclosed above, the method further comprises generating a second computing resource on one or more cloud-based computing platforms based on the received one or more processing instructions. Additionally or alternatively to one or more examples disclosed above, receiving one or more requests from the second computing resource for access to the data set stored in the in the one or more containers within the first computing resource includes receiving requests from the second computing resource, wherein the requests are based on the received one or more processing instructions. Additionally or alternatively to one or more examples disclosed above, the first computing resource is a physical storage device that is maintained by a single user.

Other examples of the disclosure are directed to a non-transitory computer-readable storage medium storing one or more programs for providing secure access to data stored on a computing resource to one or more cloud-based computing resources, the one or more programs configured to be executed by one or more processors communicatively coupled to one or more processors of a system, the one or more programs including instructions to cause the system to, receive a data set, generate one or more data containers within a first computing resource based on the received one or more processing instructions, store the data set in the one or more containers within the first computing resource, receive one or more requests from a second computer resource that are provisioned on one or more cloud-based computing platforms for access to the data set stored in the one or more containers within the first computing resource, generate one or more tokens for access to the data set stored in the in the one or more containers within the first computing resource, wherein the generated tokens are based on one or more parameters associated with the second computing resource that is provisioned on one or more cloud-based computing platforms, and transmit the one or more tokens for access to the data set stored in the in the one or more containers within first computing resource to the second computing resource. Additionally or alternatively to one or more examples disclosed above, the one or more parameters includes an IP address of the second computing resource that transmitted the request, and generating one or more tokens for access to the data set to the data set stored in the in the one or more containers within the first computing resource includes generating the one or more tokens for access to the data set based on the IP address of the request. Additionally or alternatively to one or more examples disclosed above, the generating one or more tokens for access to the data set to the data set stored in the in the one or more containers within the first computing resource includes determining a duration of time for allowing access to the data set and generating the one or more tokens for access to the data set based on the determined duration of time for allowing access to the data set. Additionally or alternatively to one or more examples disclosed above, the method further comprises renewing the generated token when it is determined that the determined duration of time will expire within a predetermined amount of time. Additionally or alternatively to one or more examples disclosed above, the method further comprises generating a storage account within the first computing resource based on a source of the received data set. Additionally or alternatively to one or more examples disclosed above, the method further comprises generating a storage container within the storage account based on an identified engagement from the source of the received data set. Additionally or alternatively to one or more examples disclosed above, the method further comprises storing the received data set in the generated storage container. Additionally or alternatively to one or more examples disclosed above, the method further comprises encrypting the data set stored in the generated storage container. Additionally or alternatively to one or more examples disclosed above, the method further comprises encrypting the data set. Additionally or alternatively to one or more examples disclosed above, the method further comprises receiving one or processing instructions, wherein the one or more processing instructions corresponds to the received data set and includes one or more processing tasks to be performed on the received data set. Additionally or alternatively to one or more examples disclosed above, the method further comprises generating a second computing resource on one or more cloud-based computing platforms based on the received one or more processing instructions. Additionally or alternatively to one or more examples disclosed above, receiving one or more requests from the second computing resource for access to the data set stored in the in the one or more containers within the first computing resource includes receiving requests from the second computing resource, wherein the requests are based on the received one or more processing instructions. Additionally or alternatively to one or more examples disclosed above, the first computing resource is a physical storage device that is maintained by a single user.

The foregoing description, for purpose of explanation, has made reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments, with various modifications, that are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:
1. A method for providing secure access to data stored on a computing resource to one or more cloud-based computing resources, the method comprising:
    receiving a data set;
    receiving one or more processing instructions associated with the received data set, wherein the one or more processing instructions corresponds to the received data set and includes one or more processing tasks to be performed on the received data set;
    generating one or more data containers within a first computing resource based on the received one or more processing instructions;
    storing the data set in the one or more containers within the first computing resource;
    configuring a second computing resource on one or more cloud-based computing platforms based on the received one or more processing instructions, wherein generating the computing resource comprises selecting one or more pre-defined specifications of computing clusters based on the received one or more processing instructions, and wherein configuring a second computing resource on the one or more cloud-based computing platforms comprises embedding one or more hooks in the second computing resource configured to record lineage data about one or more transactions processed by the second computing resource;
    receiving one or more requests from the second computer resource for access to the data set stored in the one or more containers within the first computing resource;
    generating one or more tokens for access to the data set stored in the one or more containers within the first computing resource, wherein the generated tokens are based on one or more parameters associated with the second computing resource that is provisioned on one or more cloud-based computing platforms; and transmitting the one or more tokens for access to the data set stored in the one or more containers within first computing resource to the second computing resource.

2. The method of claim 1, wherein the one or more parameters includes an IP address of the second computing resource that transmitted the request, and wherein generating one or more tokens for access to the data set stored in the one or more containers within the first computing resource includes generating the one or more tokens for access to the data set based on the IP address of the request.

3. The method of claim 1, wherein the method further comprises generating a storage account within the first computing resource based on a source of the received data set.

4. The method of claim 1, wherein the method further comprises encrypting the data set.

5. A system for providing secure access to data stored on a computing resource to one or more cloud-based computing resources, the system comprising:
   one or more processors;
   a memory; and
   a first computing resource;
   wherein the one or more processors are configured to execute instructions stored on the memory that cause the system to:
      receive a data set;
      receive one or more processing instructions associated with the received data set, wherein the one or more processing instructions corresponds to the received data set and includes one or more processing tasks to be performed on the received data set;
      generate one or more data containers within the first computing resource based on the received one or more processing instructions;
      store the data set in the one or more containers within the first computing resource;
      configure a second computing resource on one or more cloud-based computing platforms based on the received one or more processing instructions, wherein generating the computing resource comprises selecting one or more pre-defined specifications of computing clusters based on the received one or more processing instructions, and wherein configuring a second computing resource on the one or more cloud-based computing platforms comprises embedding one or more hooks in the second computing resource configured to record lineage data about one or more transactions processed by the second computing resource;
      receive one or more requests from the second computer resource for access to the data set stored in the one or more containers within the first computing resource;
      generate one or more tokens for access to the data set stored in the one or more containers within the first computing resource, wherein the generated tokens are based on one or more parameters associated with the second computing resource that is provisioned on one or more cloud-based computing platforms; and
      transmit the one or more tokens for access to the data set stored in the one or more containers within first computing resource to the second computing resource.

6. The system of claim 5, wherein the one or more parameters includes an IP address of the second computing resource that transmitted the request, and wherein generating one or more tokens for access to the data set stored in the one or more containers within the first computing resource includes generating the one or more tokens for access to the data set based on the IP address of the request.

7. The system of claim 5, wherein the system is further caused to generate a storage account within the first computing resource based on a source of the received data set.

8. The system of claim 5, wherein the system is further caused to encrypt the data set.

9. The system of claim 5, wherein receiving one or more requests from the second computing resource for access to the data set stored in the one or more containers within the first computing resource includes receiving requests from the second computing resource, wherein the requests are based on the received one or more processing instructions.

10. A non-transitory computer-readable storage medium storing one or more programs for providing secure access to data stored on a computing resource to one or more cloud-based computing resources the one or more programs configured to be executed by one or more processors communicatively coupled to one or more processors of a system, the one or more programs including instructions to cause the system to:
   receive a data set;
   receive one or more processing instructions associated with the received data set, wherein the one or more processing instructions corresponds to the received data set and includes one or more processing tasks to be performed on the received data set;
   generate one or more data containers within the first computing resource based on the received one or more processing instructions;
   store the data set in the one or more containers within the first computing resource;
   configure a second computing resource on one or more cloud-based computing platforms based on the received one or more processing instructions, wherein generating the computing resource comprises selecting one or more pre-defined specifications of computing clusters based on the received one or more processing instructions, and wherein configuring a second computing resource on the one or more cloud-based computing platforms comprises embedding one or more hooks in the second computing resource configured to record lineage data about one or more transactions processed by the second computing resource;
   receive one or more requests from the second computer resource for access to the data set stored in the one or more containers within the first computing resource;
   generate one or more tokens for access to the data set stored in the one or more containers within the first computing resource, wherein the generated tokens are based on one or more parameters associated with the second computing resource that is provisioned on one or more cloud-based computing platforms; and
   transmit the one or more tokens for access to the data set stored in the one or more containers within first computing resource to the second computing resource.

11. The non-transitory computer-readable storage medium of claim 10, wherein the one or more parameters includes an IP address of the second computing resource that transmitted the request, and wherein generating one or more tokens for access to the data set stored in the one or more containers within the first computing resource includes generating the one or more tokens for access to the data set based on the IP address of the request.

12. The non-transitory computer-readable storage medium of claim 10, wherein the system is further caused to generate a storage account within the first computing resource based on a source of the received data set.

13. The non-transitory computer-readable storage medium of claim 10, wherein the system is further caused to encrypt the data set.

14. The non-transitory computer-readable storage medium of claim 10, wherein receiving one or more requests from the second computing resource for access to the data set stored in the one or more containers within the first computing resource includes receiving requests from the second computing resource, wherein the requests are based on the received one or more processing instructions.

* * * * *